United States Patent Office 3,476,558
Patented Nov. 4, 1969

3,476,558
LIGHT-SENSITIVE ELEMENT CONTAINING METHINE DYES
Henri Depoorter and Marcel Jan Libeer, Mortsel-Antwerp, Belgium, assignors to Gevaert-Agfa N.V., Mortsel, Belgium, a Belgian company
No Drawing. Filed Nov. 24, 1965, Ser. No. 509,609
Claims priority, application Great Britain, Nov. 27, 1964, 48,269/64
Int. Cl. G03c 1/12, 1/22; C09b 23/10
U.S. Cl. 96—1.7
9 Claims

ABSTRACT OF THE DISCLOSURE

Light-sensitive photographic elements are described which include a merocyanine dye which contains a benzimidazothiazinone nucleus. These elements have extended spectral sensitivity.

---

This invention relates to new methine dyes as optical sensitising agents for light-sensitive silver halide and photoconductive compounds, and to light-sensitive materials sensitised therewith.

More particularly the present invention relates to merocyanine dyes containig a bezimidazothiazinone nucleus and especially to merocyanine dyes containing, linked to a methine chain, a heterocyclic residue according to the following general structure (I):

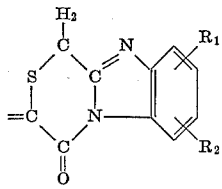

wherein:

each of $R_1$ and $R_2$ represents hydrogen or halogen e.g. chlorine.

According to the present invention, new merocyanine dyes are provided, which correspond to the following general Formula II:

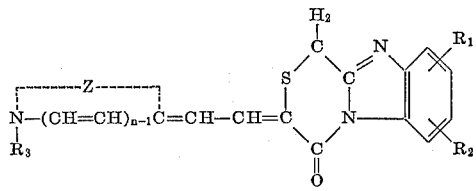

wherein:

$R_1$ and $R_2$ have the same significance as described above,
$R_3$ represents an alkyl radical,
$n$ is 1 or 2, and Z represents the atoms necessary to complete a heterocyclic nitrogen nucleus containing 5 to 6 atoms in the heterocyclic ring such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4 - methylbenzothiazole, 5 - methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole), those of the naphthothiazole series (e.g. naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, 7-methoxynaphtho[2,1-d]thiazole), those of the thionaphtheno[7,6-d] thiazole series (e.g. 7-methoxythionaphtheno[7,6-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5-chlorobenzoxazole, 5 - methylbenzoxazole, 5 - phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6-hydroxybenzoxazole), those of the naphthoxazole series (e.g. naphtho [2,1-d]oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole), those of the naphthoselenazole series (e.g. naphtho[2,1 - d]selenazole, naphtho[1,2 - d]selenazole), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the oxazoline series (e.g. oxazoline, 4-hydroxymethyl-4-methyloxazoline, 4,4-bis-hydroxymethyloxazoline, 4-acetoxymethyl-4-methyloxazoline, 4,4-bis-acetoxymethyloxazoline), those of the selenazoline series (e.g. selenazoline), those of the 2-quinoline series (e.g. the quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), those of the benzimidazole series (e.g. 1-ethylbenzimidazole, 1 - phenylbenzimidazole, 1 - ethyl - 5,6 - dichlorobenzimidazole, 1 - hydroxyethyl - 5,6 - dichlorobenzimidazole, 1-ethyl-5-chlorobenzimidazole, 1-ethyl-5,6-dibromobenzimidazole, 1-ethyl-5-chloro-6-bromobenzimidazole, 1-ethyl-5-phenylbenzimidazole, 1-ethyl-5-fluorobenzimidazole, 1-ethyl-5,6-difluorobenzimidazole, 1-ethyl - 5 - cyanobenzimidazole, 1-(β-acetoxyethyl) - 5 - cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-chloro-6-fluorobenzimidazole, 1-ethyl-5-carboxybenzimidazole, 1-ethyl - 7 - carboxybenzimidazole, 1-ethyl-5-carbethoxybenzimidazole, 1-ethyl-7-carbethoxybenzimidazole, 1-5-sulphamylbenzimidazole, or 1-ethyl-5-N-ethylsulphamylbenzimidazole).

The merocyanine dyes according to the general Formula II can be prepared by condensing a benzimidazothiazinone compound of the following general Formula III:

(III)
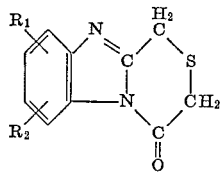

wherein $R_1$ and $R_2$ have the same significance as described above, with a heterocyclic quaternary ammonium salt according to the following general Formula IV:

(IV)
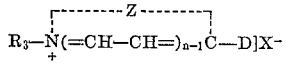

wherein:

$R_3$, Z and $n$ have the same significance as described above,

D represents a β-acetanilidovinyl group or a β-p-toluene sulphonanilidovinyl groups, and $X^-$ represents an acid radical.

The condensations are advantageously carried out in the presence of a basic condensing agent, for example a trialkylamine such as triethylamine, a dialkylaniline, or a heterocyclic tertiary amine such as pyridine or N-alkylpiperidine. The condensations of this type can also be carried out by allowing the intermediates to react in the presence of an inert solvent such as methanol, ethanol, whilst heating if needed.

The following illustrates the preparation of compounds according to the general Formula III.

PREPARATION 1

4-oxo-3,4-dihydro-1H-1,4-thiazino[4,3-a]benzimidazole

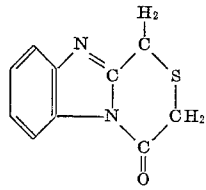

is prepared as described by A. L. Misra, J. Org. Chem. 23 (1958) 897.

PREPARATION 2

(a) (5,6-dichloro-2-benzimidazolyl)-methane thiol

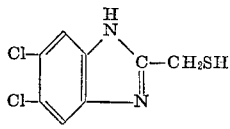

A solution of 13.6 g. of 4,5-dichloro-o-phenylenediamine and 9.4 g. of 80% thioglycolic acid in 80 ml. of 4 N hydrochloric acid is refluxed for 1 hour. The precipitated mercapto compound is purified by dissolution in sodium hydroxide and acidification with acetic acid. Yield: 12.7 g. Melting point: about 250° C. (with decomposition).

(b) 5,6-dichloro-2-benzimidazolyl)-methylthioacetic acid

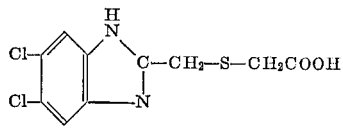

12.7 g. of (5,6-dichloro-2-benzimidazolyl)-methane thiol and 5.4 g. of chloroacetic acid are dissolved in 65 ml. of 2 N sodium hydroxide and boiled for 1 hour. Then, 150 ml. of water are added and the mixture is boiled and filtered. The filtrate is acidified with acetic acid and the precipitate formed is washed with water and recrystallised from ethanol. Yield: 10.3 g. Melting point: 236° C.

(c) 7,8-dichloro-4-oxo-3,4-dihydro-1H-1,4-thiazino [4,3-a]benzimidazole

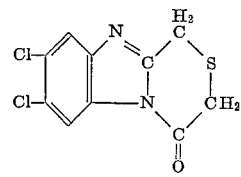

10.3 g. of (5,6-dichloro-2-benzimidazolyl)-methylthioacetic acid are dissolved in 30 ml. of pyridine, whereupon 5 ml. of acetic anhydride are added. The mixture is boiled for 3 min. and then cooled. The formed precipitate is sucked off and washed with ether. Yield: 7.3 g. Melting point: 213° C.

The following examples illustrate the preparation of merocyanine dyes according to the present invention.

EXAMPLE 1

3-[2-3-ethyl-2-thiazolidinylidene)-ethylidene]-4-oxo-3,4-dihydro-1H-1,4-thiazino[4,3-a]benzimidazole

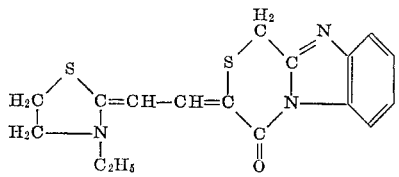

To a solution of 3.55 g. of 2-acetanilidovinyl-3-ethylthiazolinium bromide and 2.04 g. of 4-oxo-3,4-dihydro-1H-1,4-thiazino[4,3-a]benzimidazole in 25 ccs. of absolute ethanol, 2.8 ccs. of triethylamine are added. The solution obtained is boiled for 10 min. and the precipitate formed is filtered with suction and purified by recrystallisation from ethylene glycol monomethyl ether. Yield: 1.65 g. Melting point: 224° C. $\lambda_{max.}=446$ nm. $\epsilon=6.02\times10^4$.

1 kg. of a gelatino-silver chlorobromide emulsion is sensitised with 10 mg. of the sensitising dye as prepared above and having a sensitisation maximum of 510 nm.

EXAMPLE 2

3-[2-(3-ethyl - 2 - thiazolidinylidene)-ethylidene]-4-oxo-7,8-dichloro - 3,4 - dihydro-1H-1,4-thiazino[4,3-a] benzimidazole

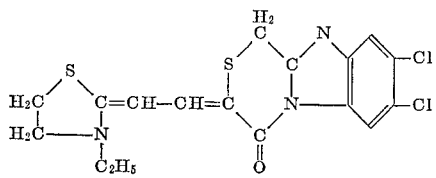

This product is prepared in the same way as that of Example 1, with the proviso, however, that the used amount of 4-oxo - 3,4 - dihydro-1H-1,4-thiazino[4,3-a] benzimidazole is replaced by 2.73 g. of 7,8-dichloro-4-oxo-3,4-dihydro - 1H - 1,4 - thiazino[4,3-a]benzimidazole. Melting point: 240° C. $\lambda_{max.}=450$ nm. $\epsilon=5.50\times10^4$.

1 kg. of a gelatino-silver chlorobromide emulsion is sensitised with 20 mg. of the sensitising dye as prepared above and having a sensitisation maximum at 510 nm.

EXAMPLE 3

3-[2-(1,3-diethyl-5,6-dichloro - 2 - benzimidazolinylidene)-ethylidene]-4-oxo - 3,4 - dihydro-1H-1,4-thiazino [4,3-a]benzimidazole

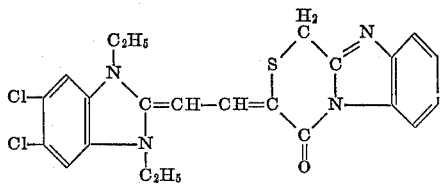

To a suspension of 2.04 g. of 4-oxo-3,4-dihydro-1H-1,4-thiazino[4,3-a]benzimidazole and 5.37 g. of 1,3-diethyl-2-[β-(p - toluenesulfonanilido)-vinyl]-5,6-dichlorobenzimidazolium chloride and 40 ccs. of pyridine, 1.4 cc. of triethylamine is added. The mixture is boiled for 10 min., whereupon it is poured into water. The formed dye precipitate is filtered with suction and purified by recrystallisation from a mixture consistnig of equal parts of pyridine and isopropanol. Yield: 0.9 g. Melting point: above 260° C. $\lambda_{max.}=493$ nm. $\epsilon=8.70\times10^4$.

1 kg. of a gelatino-silver chloride emulsion is sensitised with 30 mg. of the sensitising dye as described above and having a sensitisation maximum at 520 nm.

EXAMPLE 4

3-[2-(1,3-diethyl - 5 - cyano-2-benzimidazolinylidene)-ethylidene]-4-oxo-3,4-dihydro - 1H - 1,4 - thiazino[4,3-a] benzimidazole

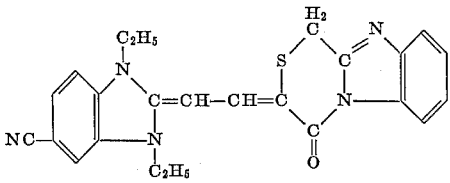

This product is prepared in the same way as that of Example 3 but after having replaced 5.37 g. of 1,3-diethyl-2-[β-(p-toluenesulfonanilido)-vinyl]5,6 - dichlorobenzimidazolium chloride by 4.95 g. of 1,3-diethyl-2-[β-(p-toluenesulfonanilido)-vinyl] - 5 - cyanobenzimidazolium chloride. Melting point: 256° C. $\lambda_{max.}=492$ nm. $\epsilon=9.55\times10^4$.

1 kg. of a gelatino-silver chloride emulsion is sensitised with 30 mg. of the sensitising dye as described above and having a sensitisation maximum at 525 nm.

EXAMPLE 5

3-[2-(1-ethyl - 2 - pyrrolidinylidene)-ethylidene]-4-oxo - 3,4 - dihydro-1H-1,4-thiazino 4,3-a]benzimidazole

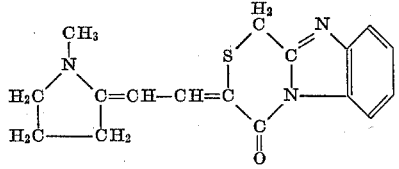

To a solution of 3.28 g. of 1-methyl-2-(β-anilinovinyl)-pyrrolinium iodide and 2.04 g. of 4-oxo-3,4-dihydro-1H-1,4-thiazino[4,3-a]benzimidazole in 20 ccs. of acetic anhydride, 1.4 cc. of triethylamine is added. The mixture is boiled for 30 min. After the addition of water, the resulting precipitate is collected by filtration and purified by recrystallisation from ethanol. Yield: 0.15 g. Melting point: above 275° C. $\lambda_{max.}=443$ nm. $\epsilon=5.01\times10^4$.

1 kg. of a gelatino-silver chloride emulsion is sensitized with 15 mg. of the sensitising dye as described above and having a sensitisation maximum at 480 nm.

As appears from the examples, the new merocyanine dyes are useful for extending the spectral sensitivity of photographic silver halide emulsions, especially of the customarily employed gelatino-silver chloride, gelatino-silver chloride-bromide, gelatino-silver bromide, gelatino-silver bromo-iodide and gelatino-silver chloro-bromo-iodide emulsions. Photographic emulsions containing water-permeable coloids other than gelatin, such as agar-agar, zein, collodion, water-soluble cellulose derivatives, poly(vinyl alcohol) or other hydrophilic synthetic or natural resins or polymeric compounds, can, however, also be sensitised with the merocyanine dyes according to the present invention.

In order to prepare photographic emulsions sensitised according to this invention by one or more of the new merocyanine dyes, the latter are incorporated in the photographic emulsion by one of the methods customarily employed in the art. In practice, it is convenient to add the dyes to the emulsion in the form of a solution in an appropriate solvent. The new merocyanine dyes can be added at any stage of the preparation of the emulsion and should be uniformly distributed throughout the emulsion. The concentration of the dyes in the emulsion may vary widely, for example from 1 to 200 mg. per kg. of flowable emulsion and will vary according to the effect desired. The most suitable and most economical concentration for any particular emulsion will be apparent to those skilled in the art, upon making the ordinary tests and observations customarily used in the art of emulsion making.

The new merocyanine dyes can be incorporated into photographic emulsions the general sensitivity of which has been increased by physical and chemical ripening. As suitable chemical sensitisers may be mentioned the well-known sulphur sensitisers such as allyl isothiocyanate, allyl thiourea, sodium thiosulphate, potassium selenocyanide, the natural sensitisers originating in the gelatin, the reducing sensitisers such as imino-aminomethane-sulphinic acid and the derivatives thereof, further cadmium salts, and the salts of noble metals such as gold, platinum and palladium.

In preparing the photographic emulsions according to the invention, the usual and suitable addenda such as antifogging agents, stabilisers, antibronzing agents, hardeners, wetting agents, plasticisers, development accelerators, colour couplers, fluorescent brighteners and ultra-violet screening compounds can moreover be incorporated in the emulsion in the manner customarily employed in the art. In this respect it may be mentioned that the sensitivity of the silver halide emulsions sensitised according to the process of the present invention is not adversely affected but rather enhanced by the presence therein of certain fluorescent compounds.

The photographic emulsions optically sensitised according to the invention may further be supersensitised and/or hypersensitised by one of the methods known to those skilled in the art.

Emulsions sensitised with the new merocyanine dyes can be coated in the usual manner on a suitable support such as glass, cellulose derivative film, resin film or paper.

Although the merocyanine dyes according to the present invention are especially useful for extending the spectral sensitivity of silver halide emulsions, the merocyanine dyes according to this invention also possess optically sensitising properties for photoconductive compounds e.g. photoconductive zinc oxide.

The new merocyanine dyes according to this invention can be incorporated in the photoconductive layer by one of the methods customarily employed in the art.

The merocyanine dyes according to this invention are incorporated preferably in a photoconductive layer such as a photoconductive layer containing photoconductive zinc oxide, in an amount of 0.05 to 0.1 mole percent in respect of the photoconductive substance.

The following sensitisation values are obtained from a photoconductive zinc oxide layer containing per mole of photoconductive zinc oxide 0.1 mole of dyestuff as indicated in the following table.

| Dyestuff according to— | Total sensitivity (relative values) | Optical sensitisation maximum (nm.) |
|---|---|---|
| Example 1 | 100 | |
| Example 2 | 530 | 450 |
| Example 3 | 260 | 460 |
| Example 4 | 800 | 500 |
| Example 5 | 700 | 500 |
|  | 260 | 455 |

What we claim is:

1. A light-sensitive element containing light-sensitive silver halide optically sensitized with a merocyanine dye containing a benzimidazothiazinone nucleus.

2. A light-sensitive element containing lightsensitive silver halide optically sensitized with a merocyanne dye containing at least one heterocyclic residue according to the following structure:

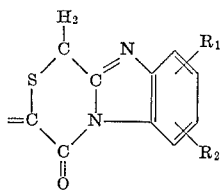

wherein
each of $R_1$ and $R_2$ represents hydrogen or halogen.

3. The light-sensitive element of claim 1 wherein the merocyanine dye has the formula:

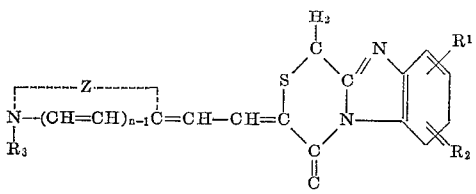

wherein
$R_1$ and $R_2$ each represents hydrogen or halogen,
$R_3$ represents an alkyl radical,
Z represents the atoms necessary to complete a heterocyclic nucleus containing 5 to 6 atoms in the heterocyclic ring, and
$n$ represents 1 or 2.

4. A light-sensitive element containing photoconductive zinc oxide optically sensitized with a merocyanine dye containing a benzimidazothiazinone nucleus.

5. A light-sensitive element containing photoconductive zinc oxide optically sensitized with a merocyanine dye containing at least one heterocyclic residue according to the following structure:

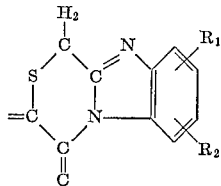

wherein
each of $R_1$ and $R_2$ represents hydrogen or halogen.

6. The light-sensitive element of claim 4 wherein the merocyanine dye has the formula:

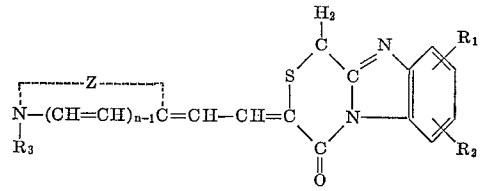

wherein
$R_1$ and $R_2$ each represents hydrogen or halogen,
$R_3$ represents an alkyl radical,
Z represents the atoms necessary to complete a heterocyclic nucleus containing 5 to 6 atoms in the heterocyclic ring, and
$n$ represents 1 or 2.

7. A photographic light-sensitive silver halide emulsion containing a merocyanine dye containing a benzimidazothiazinone nucleus.

8. A photographic light-sensitive silver halide emulsion containing a merocyanine dye containing at least one heterocyclic residue according to the following formula:

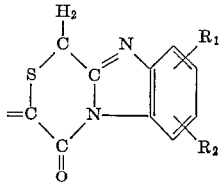

wherein
each of $R_1$ and $R_2$ represents hydrogen or halogen.

9. The emulsion of claim 7 wherein the merocyanine dye has the formula:

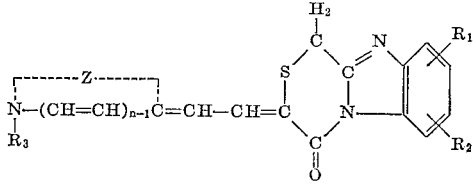

$R_1$ and $R_2$ each represents hydrogen or halogen,
$R_3$ represents an alkyl radical,
Z represents the atoms necessary to complete a heterocyclic nucleus containing 5 to 6 atoms in the heterocyclic ring, and
$n$ represents 1 or 2.

References Cited

UNITED STATES PATENTS

| 2,526,632 | 10/1950 | Brooker et al. | 96—102 |
| 2,548,571 | 4/1951 | Lare et al. | 96—102 |
| 3,326,688 | 6/1967 | Jenkins | 96—106 |

GEORGE F. LESMES, Primary Examiner

J. P. BRAMMER, Assistant Examiner

U.S. Cl. X.R.

96—102, 105, 106; 260—240.4